United States Patent
Surace

(10) Patent No.: US 7,823,146 B2
(45) Date of Patent: Oct. 26, 2010

(54) METHOD AND SYSTEM FOR SOFTWARE INSTALLATION

(75) Inventor: Luke Adam Surace, Melbourne Victoria (AU)

(73) Assignee: Computer Associates Think, Inc., Islandia, NY (US)

( * ) Notice: Subject to any disclaimer, the term of this patent is extended or adjusted under 35 U.S.C. 154(b) by 1475 days.

(21) Appl. No.: 10/983,062

(22) Filed: Nov. 5, 2004

(65) Prior Publication Data

US 2005/0114864 A1 May 26, 2005

Related U.S. Application Data

(60) Provisional application No. 60/518,584, filed on Nov. 7, 2003.

(51) Int. Cl.
G06F 9/44 (2006.01)
G06F 9/445 (2006.01)

(52) U.S. Cl. .................. 717/169; 717/168; 717/174; 717/175

(58) Field of Classification Search .............. 717/101, 717/100, 168–178; 379/88.16, 88.18, 218.01, 379/265.01, 265.11, 266.01; 370/356, 401, 370/355; 455/414.3
See application file for complete search history.

(56) References Cited

U.S. PATENT DOCUMENTS 5,023,832 A * 6/1991 Fulcher et al. .............. 707/200
5,517,560 A * 5/1996 Greenspan ............. 379/115.01
5,590,187 A * 12/1996 Greenspan ............. 379/212.01
6,061,798 A 5/2000 Coley et al. ................. 713/201
6,233,332 B1 * 5/2001 Anderson et al. ...... 379/265.09
6,389,589 B1 * 5/2002 Mishra et al. ............... 717/170
6,393,471 B1 * 5/2002 Kobata ....................... 709/221
6,981,268 B2 * 12/2005 Shi et al. ..................... 719/331
6,999,777 B1 * 2/2006 Ganesh .................... 455/456.1
6,999,990 B1 * 2/2006 Sullivan et al. ............. 709/205
2001/0044309 A1 11/2001 Bar et al. .................... 455/456
2001/0049713 A1 12/2001 Arnold et al. ............... 709/105
2003/0105889 A1 * 6/2003 Shi et al. ..................... 709/331
2003/0163741 A1 * 8/2003 Mullins ...................... 713/202
2004/0181387 A1 * 9/2004 Petersen ...................... 703/22
2005/0021767 A1 * 1/2005 Cai ............................ 709/228

OTHER PUBLICATIONS

Notification of Transmittal of International Search Report and the Written Opinion of the International Searching Authority, or the Declaration; International Application No. PCT/US2004/037048; 12 pages, Mailed Jul. 11, 2005.
Communication pursuant to Article 96(2) EPC; Application No. 04 810 465.7-2211; 6 pages, Feb. 21, 2007.
Microsoft Windows White Paper, Windows Installer: Benefits and Implementation for System Administrators, Microsoft Corporation, 98 pages, Nov. 2001.

* cited by examiner

*Primary Examiner*—Jason D Mitchell
(74) *Attorney, Agent, or Firm*—Baker Botts L.L.P.

(57) ABSTRACT

A method and system for software installation, includes detecting a software request, identifying a caller, determining a system history of the software request based on at least one of a caller identification and the software request.

16 Claims, 5 Drawing Sheets

METHOD AND SYSTEM FOR SOFTWARE INSTALLATION

REFERENCE TO RELATED APPLICATIONS

The present disclosure is based on and claims the benefit of Provisional Application 60/518,584 filed Nov. 7, 2003, entitled "Method And System For Software Installation", the entire contents of which are herein incorporated by reference.

BACKGROUND

1. Technical Field

The present disclosure relates to software and, more specifically, to a method and system for software installation.

2. Description of the Related Art

Operating system software, such as Windows Installer, provides computer users with a vehicle to efficiently install and configure products and applications by providing a standard format for component management. Specifically, this system service is responsible for managing the installation, modification, repair and/or removal of applications. To utilize the service, application programs are described in a standard format such as, for example, "Windows Installer Format." An application program may often include an "installation package", which may include a self contained data file that contains the requirements and instructions that are followed when applications are installed. During installation, Windows Installer opens up the installation package for the application, and uses the information located therein to determine all of the installation operations that have to be performed for that specific application.

In general, Windows Installer installs and removes an application or product in parts that are referred to as "components", such as groups of files, registry data, shortcuts, etc. Quite often, multiple applications or products require the use of the same component. When such a situation arises, the method that is recommended by Microsoft for installing a multi-component product is to create a set of "merge modules" for each component and combine them together into a single Windows installation package for each application.

FIG. 1 is a block diagram illustrating the operation of merge modules for Windows Installer. A merge module 16 is created for each shared file (component) 11 that is utilized by multiple applications (A, B, C) 12, 13, 14. When each of the applications 12, 13, 14 installs the shared file, a copy 11 of that file is provided and is used by each application 12, 13, 14. A system history 15 is maintained that keeps track of which applications 12, 13, 14 utilize the shared file 11.

However, as the number of combinations of products and shared components increases, this method poses a problem for several reasons. First, merge modules may present difficulties in testing and installation because they do not support data encapsulation. In other words, they do not hide the implementation details for their data, making it difficult to understand and further develop the merge modules. Second, not only do these "super-installs" become difficult to test and install, but they may also cause the synchronization of releases to increase in complexity, and support/upgrades to become unmanageable. For example, if five different merge modules "A", "B", "C", "D", and "E" are generated and released at separate times with separate updates, the number of testing and compatibility scenarios significantly increases, resulting in many different possible combinations to be considered. Thus, a need exists for a system and method that overcomes the disadvantages of present-day merge modules and conventional software installation techniques.

Installation methods such as Microsoft's merge module method, for example, allow shared components to be utilized by different applications. However, these methods often may result in the shared components existing multiple times on the same computer.

Accordingly it would be beneficial to provide a method and system for software installation whereby a common component is stored only once on a system with multiple reference counts for each caller that utilizes that common component.

SUMMARY

A method for determining a valid software request according to an embodiment of the present disclosure includes detecting a software request, identifying a caller, and determining a system history of the software request based on at least one of a caller identification and the software request.

A method for executing a user request according to an embodiment of the present disclosure includes detecting a software request, identifying a caller, determining a system history of the software request based on at least one of a caller identification and the software request, assigning a unique identifier to the software request, and executing the software request.

A system for determining a valid software request according to an embodiment of the present disclosure includes means for detecting a software request, means for identifying a caller, and means for determining a system history of the software request based on at least one of a caller identification and the software request.

A system for executing a user request according to an embodiment of the present disclosure includes a means for detecting a software request, a means for identifying a caller, a means for determining a system history of the software request based on at least one of a caller identification and the software request, a means for assigning a unique identifier to the software request, and a means for executing the software request.

A computer storage medium according to an embodiment of the present disclosure including computer executable code for determining a valid software request includes code for detecting a software request; code for identifying a caller; and code for determining a system history of the software request based on at least one of a caller identification and the software request.

A computer storage medium according to an embodiment of the present disclosure including computer executable code for executing a user request includes code for detecting a software request; code for identifying a caller; code for determining a system history of the software request based on at least one of a caller identification and the software request; code for assigning a unique identifier to the software request; and code for executing the software request.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

Figure 1:
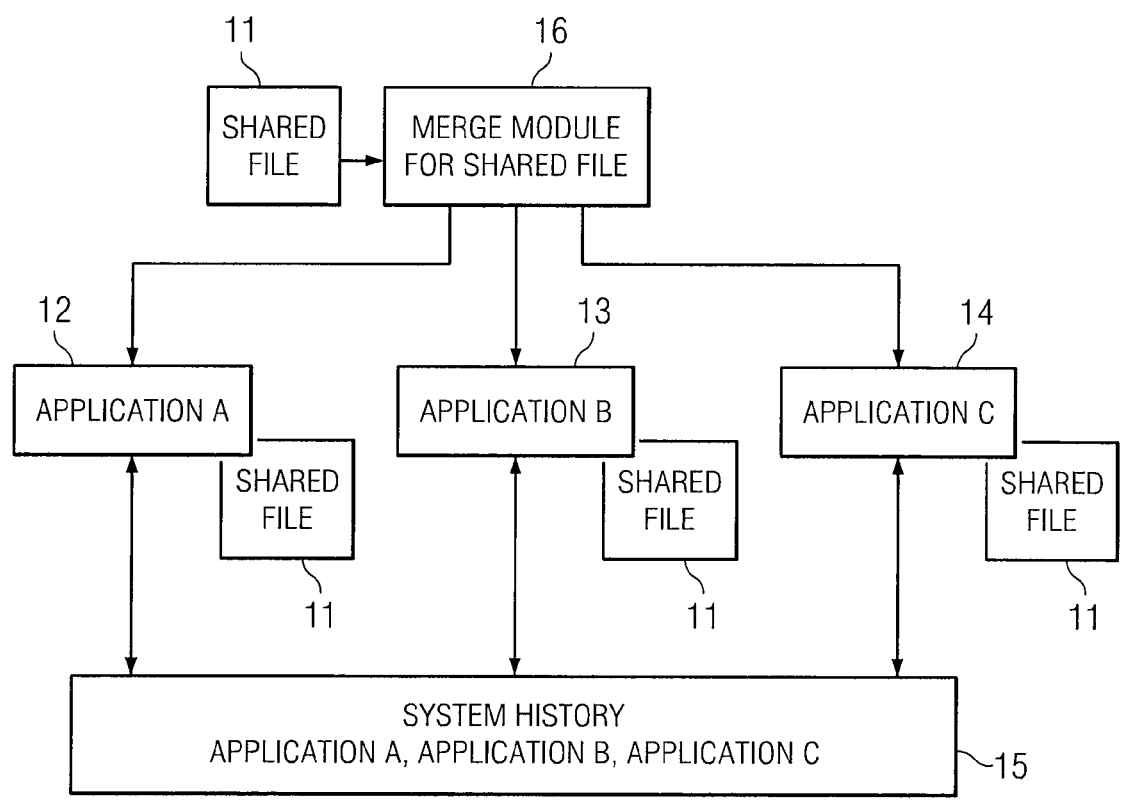
FIG. 1 is a block diagram illustrating the operation of merge modules for Windows Installer.

In describing preferred embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Figure 2:
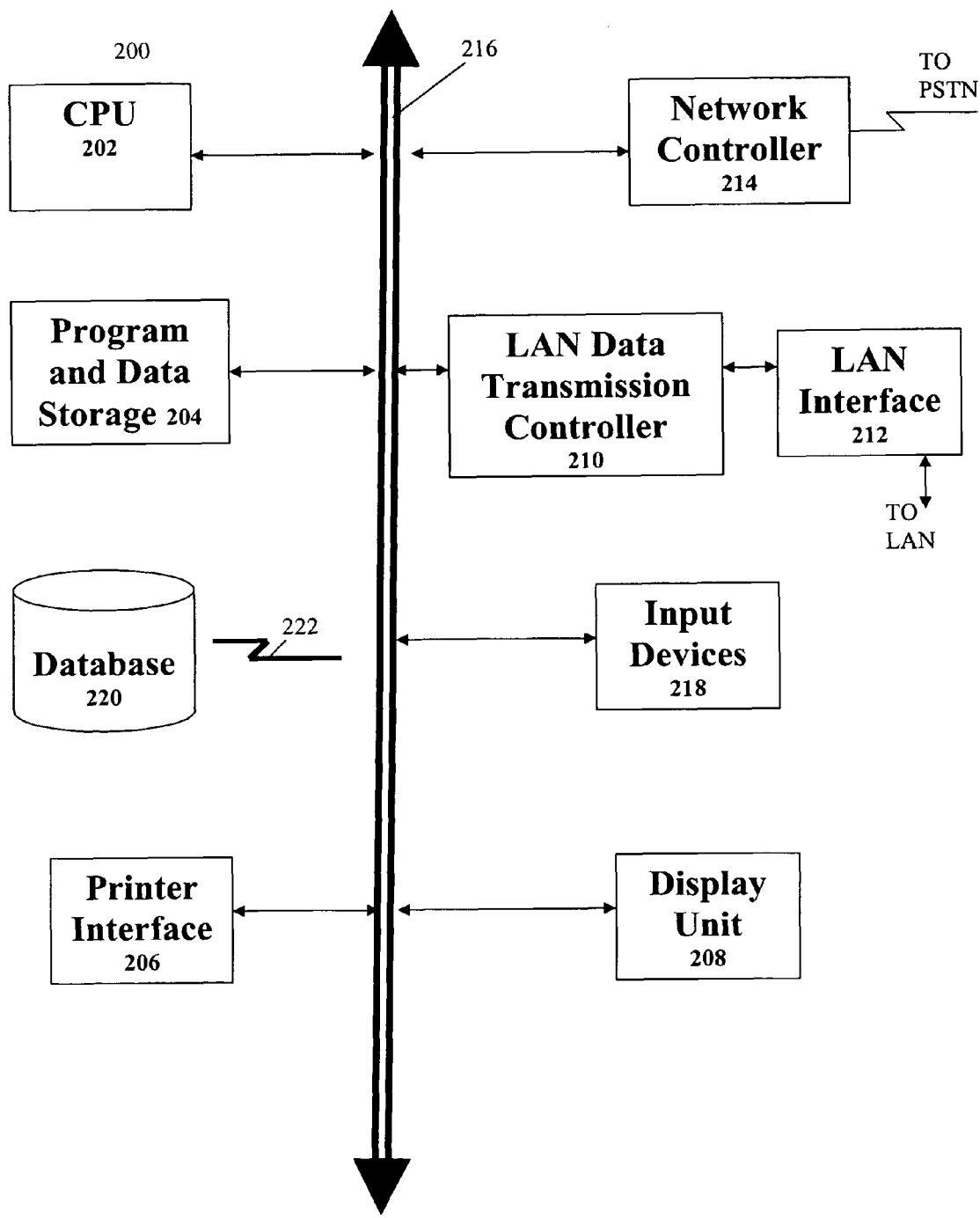
FIG. 2 shows an example of a computer system capable of implementing the method and system of the present disclosure.

FIG. 2 shows an example of a computer system which may implement the method and system of the present disclosure. The system and method of the present disclosure may be implemented in the form of a software application running on a computer system, for example, a mainframe, personal computer (PC), handheld computer, server etc. The software application may be stored on a recording media locally accessible by the computer system, for example, floppy disk, compact disk, hard disk, etc., or may be remote from the computer system and accessible via a hard wired or wireless connection to a network, for example, a local area network, or the Internet.

The computer system referred to generally as system 200 may include a central processing unit (CPU) 202, memory 204, for example, Random Access Memory (RAM), a printer interface 206, a display unit 208, a (LAN) local area network data transmission controller 210, a LAN interface 212, a network controller 214, an internal bus 216 and one or more input devices 218, for example, a keyboard, mouse etc. As shown, the system 200 may be connected to a data storage device, for example, a hard disk, 220, via a link 222.

The present method and system provides an efficient and convenient way to install and utilize shared software. The method and system of the present disclosure install the same common component only once on a computer system with multiple reference counts using a caller identification ("Caller ID") approach. Computer system(s) as referred to herein may include(s) individual computers, servers, computing resources, databases, networks, etc. This Caller ID approach, allows for efficient installation by providing a software installation package with multiple personalities.

The method and system of the present disclosure combine shared components into a single installation package which can be installed on a central computer system. A caller requiring the use of a shared component(s) may access it from the central computer system. A caller may be a client, hardware or software product, software session, etc. When a caller seeks to utilize a shared component(s), it may be assigned a unique Caller ID.

According to an embodiment of the present disclosure, in a Windows environment, for example, Caller IDs may be built into a software package containing multiple software applications (shared components) and then assigned to each software application as the software application is installed. In other words, a software package may include multiple applications, each of which may be assigned a unique Caller ID. According to another embodiment of the present disclosure, depending on the platform that is being employed (for example, UNIX, etc.), the Caller IDs may be assigned to the caller (for example, software application) during installation of a component(s) by performing a query to a remote server. According to another embodiment of the present disclosure, the Caller IDs may be randomly assigned by a user.

When a caller seeks to utilize a shared component, that caller may reference the shared component with its unique Caller ID. This results in only one copy of the required files (component) and a reference count for each caller that installs the common component.

Figure 3:
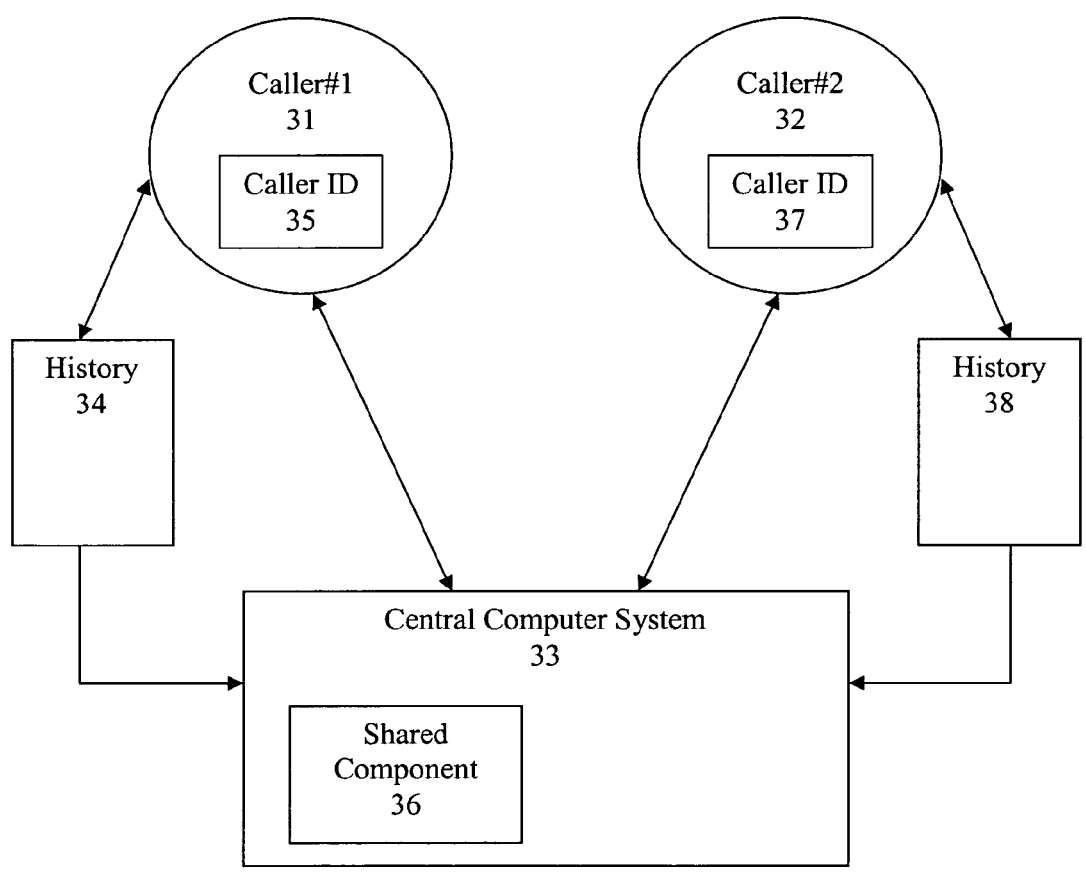
FIG. 3 is a block diagram illustrating a system for software installation, according to an embodiment of the present disclosure.

FIG. 3 is a block diagram illustrating a system for software installation, according to an embodiment of the present disclosure. One copy of the shared component(s) 36 resides on a central computer system 33. Central computer system 33 may be, for example, a network, database, system, server, etc. and may be accessed by multiple callers 31, 32. Accordingly, multiple callers 31, 32, each have a unique Caller ID 35, 37, respectively, and may access the shared component(s) 36 residing on central computer system 33. It should be noted that a caller 31, 32 may include, but is not limited to a client, hardware product, software product, software session, etc. For example, a word processing product such as Microsoft Word and a spread sheet product such as Microsoft Excel may use a common (shared) component, "spell-check code" to check the spelling of their respective documents. According to an embodiment of the present disclosure, instead of having each product contain its own copy of the spell-check code, a copy of the code may be centralized on the central computer system 33, where each product (Word and Excel) use their Caller ID to reference the spell-check code when it is requested.

According to an embodiment of the present disclosure, history files may be maintained. For example, as illustrated in FIG. 3, separate history files 34, 38 may be maintained, for example, on central computer system 33 or on any other comparable system accessible by each caller 31, 32. History files 34, 38 contain information that is linked to each caller 31, 32 providing information about all of the shared component(s) 36 each caller 31, 32 has utilized from the central computer system 33. For example, this information might include information indicating which versions of the shared component(s) 36 each caller 31, 32 is using, whether the caller 31, 32 is authorized to access a particular version of a shared component(s) 36, etc. Accordingly, software requests which in the past may have been linked to a system history may be linked to each caller's history, thereby allowing a caller's history to be readily obtained.

Figure 4:
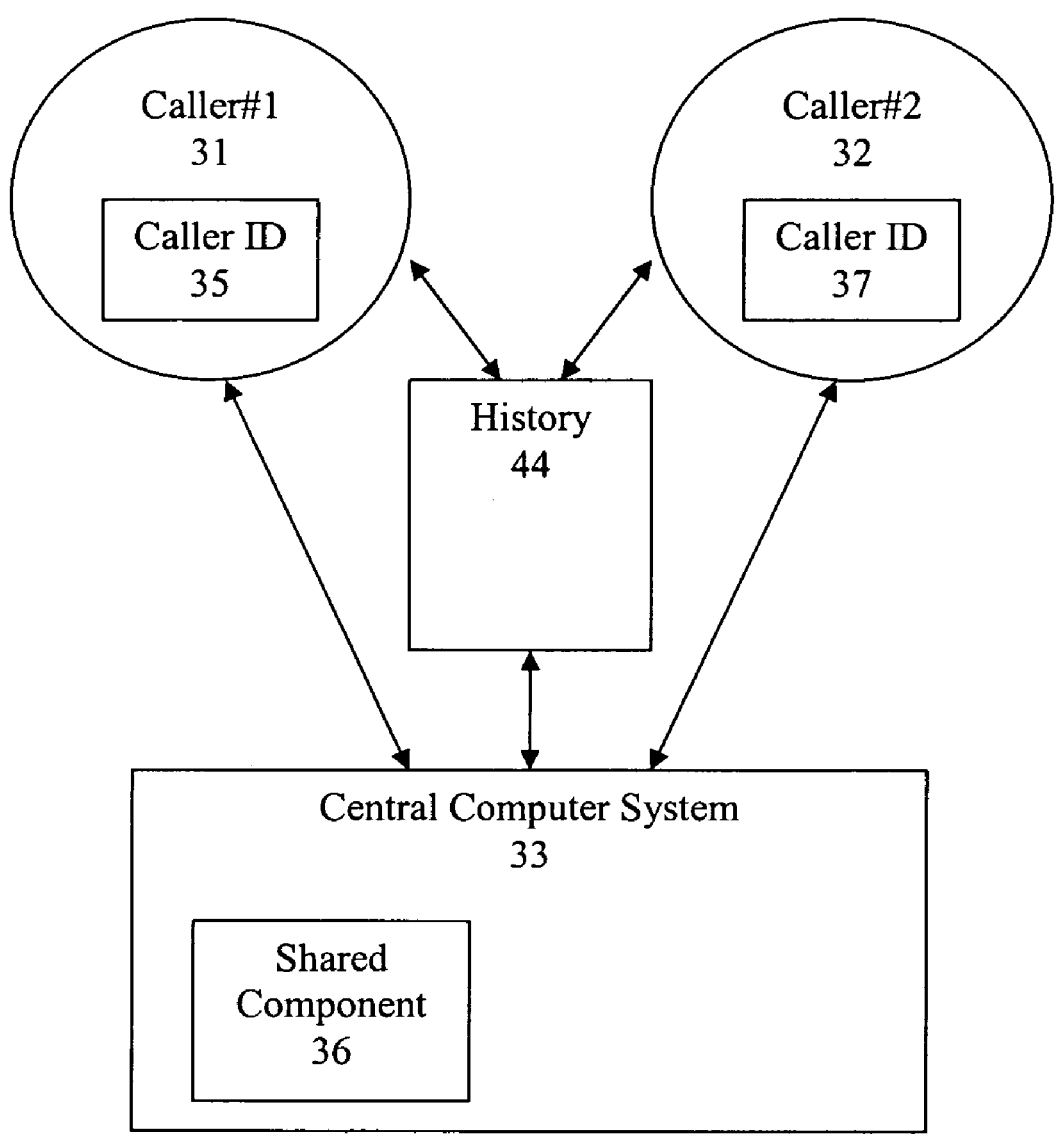
FIG. 4 is a block diagram illustrating a system for software installation, according to another embodiment of the present disclosure.

FIG. 4 is a block diagram illustrating an apparatus for software installation, according to an embodiment of the present disclosure. Each element in this embodiment may operate in the same or similar manner to those element(s) described above in FIG. 3. However, according to this embodiment, instead of each caller 31, 32 obtaining information from their own respective history files 34, 38, each caller 31, 32 may obtain information from one centralized history file 44 which may also be maintained on central computer system 43 or on any other comparable system accessible by the callers 41.

Figure 5:
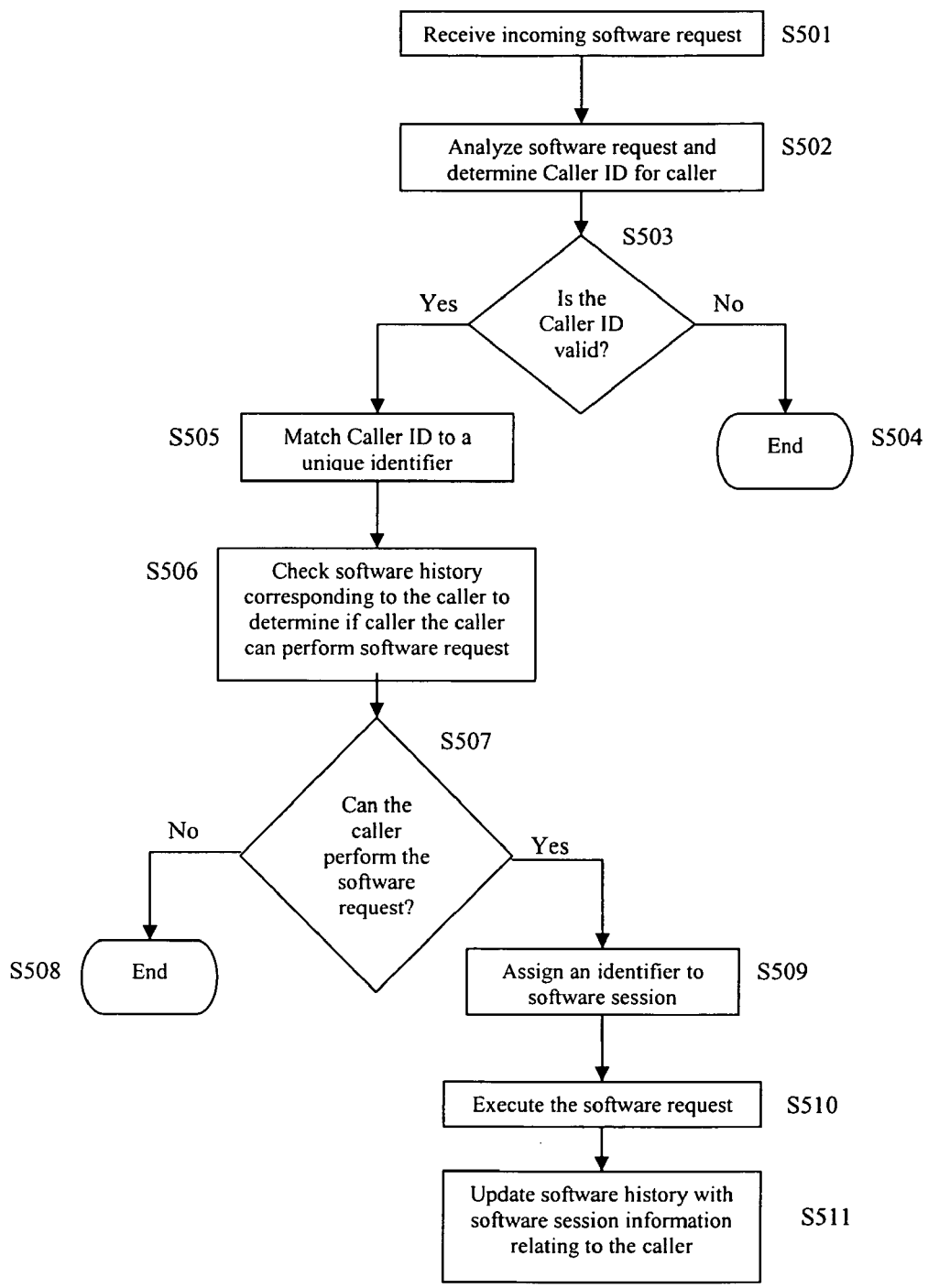
FIG. 5 is a flow chart illustrating a method for determining a valid software request and a method for executing a user request, according to an embodiment of the present disclosure.

FIG. 5 is a flow chart illustrating a method for determining a valid software request and a method for executing a user request, according to an embodiment of the present disclosure. An incoming software request is received (Step S501). The software requests may include, but are not limited to, operations such as remove, use, install, upgrade, etc. The received software request is then analyzed and a Caller ID for the requesting caller is determined (Step S502). For example, if the requesting caller is a software application, the Caller ID may be determined by checking a parameter that is passed into the software package. The system then determines if a Caller ID is valid (Step S503). If a Caller ID is determined to be invalid (No, Step S503), then the process will end (Step S504). However, if a Caller ID is determined to be valid (Yes, Step S503), then the Caller ID may be matched to a unique identifier (Step S505). The unique identifier may be used to differentiate between products and versions and may be obtained from an installation database. The installation database may be modified during initial component installation to match a unique set of identifiers based on each Caller ID. The software history may be checked for the caller by using the Caller ID to determine whether the caller is authorized to perform the software request (Step S506). For example, the system may check the software history to determine if the caller has already installed a particular update. If it is determined that either the caller cannot perform the requested service, or that such a request has already been performed (No, Step S507), the system will exit (Step S508). On the other hand, if the software request can be performed (Yes, Step S507), an identifier is assigned to the software session (Step S509). For example, this identifier can be the unique identifier previously matched to the Caller ID at Step S505. After an identifier is assigned to the software session, the system may execute the software request (Step S510). Once the software request is executed, the software history and/or related registry database may be updated with the particular session information for the caller (Step S511). For example, the unique identifier may be stored in the software history file.

Numerous additional modifications and variations of the present disclosure are possible in view of the above-teachings. It is therefore to be understood that within the scope of the appended claims, the present disclosure may be practiced other than as specifically described herein.

What is claimed is:

1. A computer-implemented method for determining a valid software request, comprising: detecting a first software request for a software component installed on a central computer system, the software component shared by a plurality of software applications on a single client computer system, the software request received from a selected one of the plurality of software applications on the single client computer system;
   in response to detecting the first software request assigning a unique Caller ID to the software application requesting the software component, the unique Caller ID selected from a plurality of unique Caller IDs built into a software package including the software component;
   detecting a second software request for the software component from the selected one of the plurality of software applications;
   identifying the selected one of the plurality of software applications requesting the software component based on the unique Caller ID assigned to the selected one of the plurality of software applications;
   determining a system history of the software request based on at least one of a caller identification and the second software request; and
   using the system history of the second software request to validate the software request, by determining if the result of the first software request would allow the performance of the second software request.

2. The method of claim 1, wherein the first software request is an install request and wherein the second software request is at least one of an operation for remove, use, and upgrade software.

3. The method of claim 1, further comprising
   modifying an installation database to match a unique set of identifiers based on the caller identification during the initial subsystem installation.

4. A method for executing a user request comprising:
   detecting a first software request for a software component installed on a central computer system, the software component shared by a plurality of software applications on a single client computer system, the software request received from a selected one of the plurality of software applications on the single client computer system;
   in response to detecting the first software request, assigning a unique Caller ID to the software application requesting the software component, the unique Caller ID selected from a plurality of unique Caller IDs built into a software package including the software component;
   detecting a second software request for the software component from the selected one of the plurality of software applications;
   identifying the selected one of the plurality of software applications requesting the software component based on the unique Caller ID assigned to the selected one of the plurality of software applications;
   determining a system history of the second software request based on at least one of a caller identification and the first software request; and
   executing the second software request.

5. The method of claim 4, further comprising the step of updating the system history with the unique Caller ID.

6. A computer storage medium including computer executable code for determining a valid software request, comprising:
   code for detecting a first software request for a software component installed on a central computer system, the software component shared by a plurality of software applications on a single client computer system, the software request received from a selected one of the plurality of software applications on the single client computer system;
   code for assigning a unique Caller ID to the software application requesting the software component, the unique Caller ID assigned to the software application in response to detecting the first software request, the unique Caller ID selected from a plurality of unique Caller IDs built into a software package including the software component;
   code for detecting a second software request for the software component from the selected one of the plurality of software applications;
   code for identifying the selected one of the plurality of software applications requesting the software component based on the unique Caller ID assigned to the selected one of the plurality of software applications;
   code for determining a system history of the software request based on at least one of a caller identification and the second software request; and
   code for using the system history of the software request to validate the second software request, by determining if the result of the first software request would allow the performance of the second software request.

7. The computer recording medium of claim 6, wherein the first software request is an install request and wherein the second software request is at least one of an operation for remove, use, and upgrade software.

8. The computer recording medium of claim 6, further comprising code for modifying an installation database to match a unique set of identifiers based on the caller identification during an initial subsystem installation.

9. A computer storage medium including computer executable code for executing a user request comprising:
    code for detecting a first software request for a software component installed on a central computer system, the software component shared by a plurality of software applications on a single client computer system, the software request received from a selected one of the plurality of software applications on the single client computer system;
    code for assigning a unique Caller ID to the software application requesting the software component, the unique Caller ID assigned to the software application in response to detecting the first software request, the unique Caller ID selected from a plurality of unique Caller IDs built into a software package including the software component;
    code for detecting a second software request for the software component from the selected one of the plurality of software applications;
    code for identifying the selected one of the plurality of software applications requesting the software component based on the unique Caller ID assigned to the selected one of the plurality of software applications;
    code for determining a system history of the second software request based on at least one of a caller identification and the first software request; and
    code for assigning a unique identifier to the software request; and
    code for executing the second software request.

10. The computer recording medium of claim 9, further comprising code for updating the system history with the unique Caller ID.

11. A system for executing a valid software request comprising:
    a client computer system having a software package comprising a plurality of software applications, at least one of the plurality of software applications operable to transmit a first software request when seeking to install one or more shared components of the software package and a second software request when seeking to utilize the one or more shared components of the software package; and
    a central computer system in communication with the client computer system, the central computer system operable to:
        store a plurality of shared software components;
        detect the first software request from the at least one of the plurality of software applications, the first software request requesting installation of the one or more shared components by the at least one of the plurality of software applications;
        in response to detecting the first software request assign a unique Caller ID to the at least one of the plurality of software applications requesting the one or more shared components the unique Caller ID selected from a plurality of unique Caller IDs built into a software package including the one or more shared components;
        receive the second software request from the at least one software application on the computer system, the software request seeking to utilize the one or more shared components;
        identify the software application from which the software request is received based on the unique Caller ID assigned to the at least one of the plurality of software applications;
        determine that the software application is authorized to perform the second software request; and
        execute the second software request in response to determining that the software application is authorized to perform the second software request.

12. The system of claim 11, wherein the first software request is an install request and wherein the second software request is at least one of an operation for remove, use, and upgrade software.

13. The system of claim 11, wherein the central computer system is further operable to modify an installation database to match a unique set of identifiers based on the caller identification during an initial subsystem installation.

14. The system of claim 11, further comprising:
    a system history database storing at least one history file including information linked to the software application, the history file including information about all of the shared components that the software application has utilized from the central computer system.

15. The system of claim 11, wherein the central computer system is further operable to match the unique Caller ID to a unique software identifier, the unique software identifier differentiating between products and versions.

16. The system of claim 11, wherein the central computer system is further operable to update a software history after executing the second software request.

* * * * *